(12) United States Patent
Lane

(10) Patent No.: US 7,887,315 B2
(45) Date of Patent: Feb. 15, 2011

(54) BLOW MOLD DESIGN

(75) Inventor: Michael T. Lane, Brooklyn, MI (US)

(73) Assignee: Amcor Limited, Abbotsford, Victoria (AU)

( * ) Notice: Subject to any disclaimer, the term of this patent is extended or adjusted under 35 U.S.C. 154(b) by 724 days.

(21) Appl. No.: 11/700,571

(22) Filed: Jan. 31, 2007

(65) Prior Publication Data
US 2008/0181982 A1 Jul. 31, 2008

(51) Int. Cl.
B29C 49/48 (2006.01)
B29C 49/64 (2006.01)

(52) U.S. Cl. .................. 425/195; 249/102; 425/526

(58) Field of Classification Search ................ 425/195, 425/522, 526; 249/102
See application file for complete search history.

(56) References Cited

U.S. PATENT DOCUMENTS 4,566,895 A * 1/1986 Kusakabe ................. 65/319
5,458,825 A 10/1995 Grolman et al.
5,968,560 A * 10/1999 Briere et al. ............ 425/192 R
6,444,159 B2 9/2002 Petre
6,447,281 B1 9/2002 Petre
6,615,472 B2 9/2003 Petre
6,648,623 B2 11/2003 Petre
6,948,924 B2 * 9/2005 Tsau et al. ................. 425/195

FOREIGN PATENT DOCUMENTS

GB 2240300 A * 7/1991
WO WO 2005042231 A1 * 5/2005

* cited by examiner

Primary Examiner—Robert B Davis

(57) ABSTRACT

A blow mold shell assembly includes a mold cavity insert defining a mold profile on an inner surface. A manifold insert is separately formed from the mold cavity insert and disposed outboard of the mold cavity insert. The manifold insert includes at least one coolant channel formed therein. The mold cavity insert is substantially solid throughout its cross-section and precluded from passing coolant. In one example, the coolant channels may be formed longitudinally through the manifold insert. A fluid inlet fitting and a fluid outlet fitting are both in fluid communication with the manifold insert.

14 Claims, 5 Drawing Sheets

BLOW MOLD DESIGN

TECHNICAL FIELD

This disclosure generally relates to an apparatus and method for forming a plastic container. More specifically, this disclosure relates to a blow mold tooling configuration having an integrally formed manifold die cavity.

BACKGROUND

As a result of environmental and other concerns, plastic containers, more specifically polyester and even more specifically polyethylene terephthalate (PET) containers are now being used more than ever to package numerous commodities previously supplied in glass containers. Manufacturers and fillers, as well as consumers, have recognized that PET containers are lightweight, inexpensive, recyclable and manufacturable in large quantities. As a result, blow-molded plastic containers have become commonplace in packaging numerous commodities.

Molds used to form such containers generally include four key features; A) a molding surface to form the container shape, B) vents formed in the cavity to atmosphere that allow air to egress the cavity as a preform inflates within the mold and ingress as the container exits the tool, C) a network of fluid channels routed within the cavity to achieve a desired mold temperature, and D) exterior mold mounting features matching machine hanger specifications.

Traditionally, one mold configuration for forming such containers includes a two-piece mold. A two-piece mold generally includes a mold holder and a cavity insert mounted within the mold holder. The cavity insert can define features A, B and C above, while feature D is defined in the hold holder. The mold holder and cavity insert are then fitted within a machine hanger. The machine hanger opens and closes the blow mold. Such two-piece mold configurations are typically used for containers having smaller diameters such as less than 95 mm (3.74 inches) for example, commonly referred to as 150 mm (5.91 inches) (referring to the inside diameter of the holder). For larger containers, a one-piece mold may be used. In a one-piece mold, all four of the above features, A, B, C and D are included in the cavity insert. Such one-piece mold configurations are used to accommodate formation of containers having diameters up to 140 mm (5.51 inches).

In either instance, it is necessary to cool the mold assembly during the mold process. In this way, cooling channels can be located within the cavity insert for delivering oil or other fluid through the cavity insert. As can be appreciated, designing and constructing such cavity inserts is complex and costly. Furthermore, because the cavity insert must be switched out when container designs change, each new mold cavity must be individually designed and formed with cooling channels routed through the structure. Thus, there is a need for a mold configuration that allows for simpler, more cost effective cooling of the mold cavity.

SUMMARY

Accordingly, the present disclosure provides a blow mold shell assembly having a mold cavity insert defining a mold profile on an inner surface. A manifold insert is separately formed from the mold cavity insert and disposed outboard of the mold cavity insert. The manifold insert includes at least one coolant channel formed therein. As can be appreciated, significant cost advantages result from the shell assembly provided herein as coolant channels need not be designed and constructed for each mold cavity design.

According to additional features, the mold cavity insert is substantially solid throughout its cross-section and precluded from passing coolant. The coolant channels may be formed longitudinally through the manifold insert. A fluid inlet fitting and a fluid outlet fitting are both connected to the manifold insert. The mold cavity insert can include a shoulder insert, a body insert and a base insert. A mold holder can be arranged outboard of the manifold insert. Because the manifold insert is separately formed from the cavity insert, it remains assembled to the mold holder during a mold cavity exchange.

Additional benefits and advantages of the present disclosure will become apparent to those skilled in the art to which the present disclosure relates from the subsequent description and the appended claims, taken in conjunction with the accompanying drawings.

DETAILED DESCRIPTION

The following description is merely exemplary in nature, and is in no way intended to limit the disclosure or its application or uses.

Figure 1:
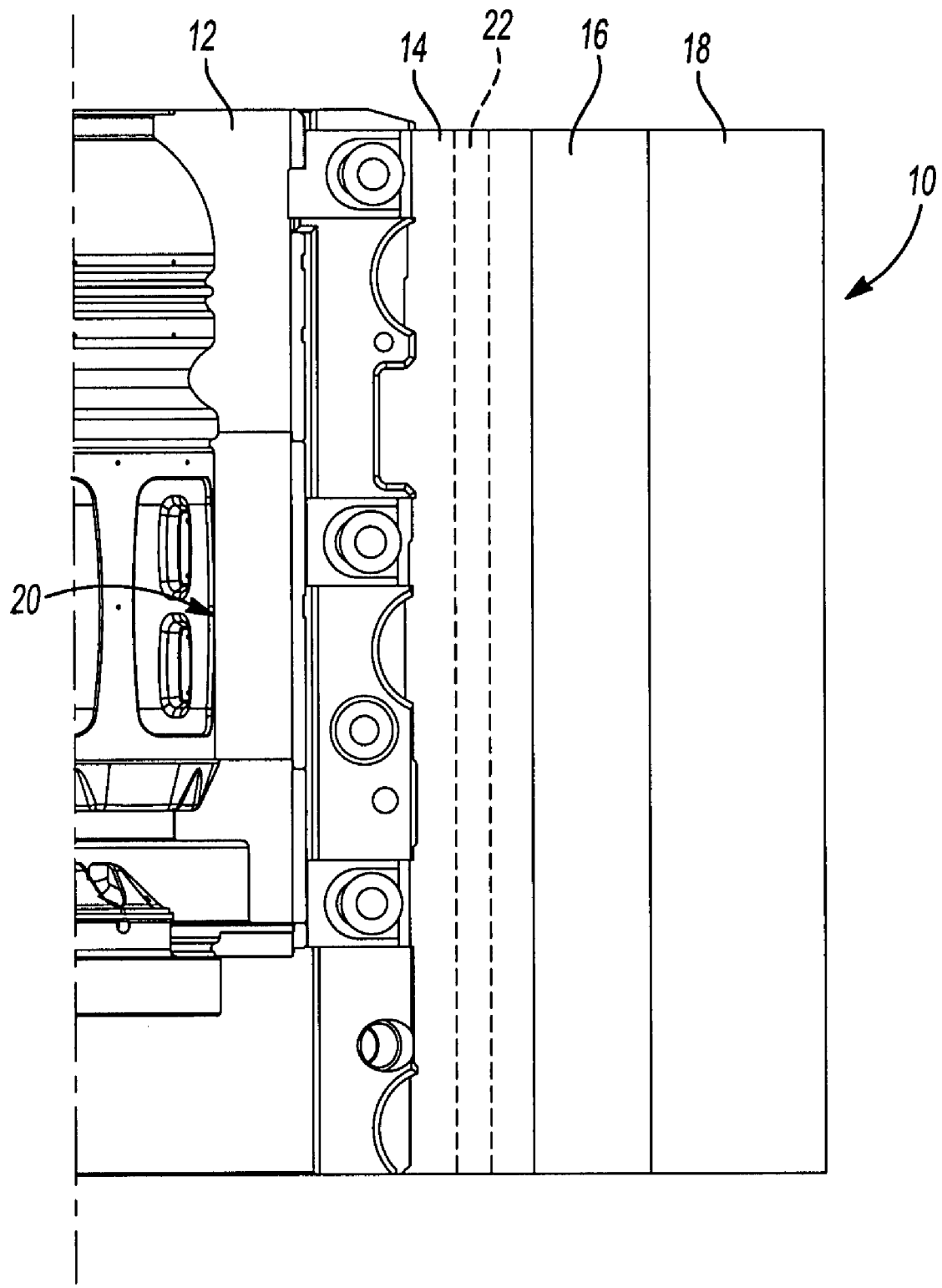
FIG. 1 is a schematic cross-sectional depiction of a blow mold shell assembly including a mold cavity insert and a separately formed manifold insert constructed in accordance with the teachings of the present disclosure and arranged inboard of an exemplary mold holder and machine hanger.

With initial reference to FIG. 1, a blow mold shell assembly according to the present teachings is shown and generally referred to as reference numeral 10. In general, the blow mold shell assembly 10 includes a mold cavity insert 12, a manifold insert 14, a mold holder 16 and a machine 18. The mold cavity insert 12 may comprise a series of mold inserts as will be described that cooperate to define a mold profile 20 on a collective inner surface. The mold cavity insert 12 is substantially solid throughout its cross-section and therefore does not include coolant channels. The manifold insert 14 according to the present teachings is separately formed from the mold cavity insert 12 and defines a plurality of coolant channels 22 therein. It is appreciated that the mold holder 16 and machine 18 are merely exemplary. As will become appreciated from the following discussion, a dedicated manifold insert 14 offers significant cost advantages over a blow mold shell assembly incorporating cooling channels within the mold cavity itself. Such cost saving are realized through the use of faster, less expensive processes for manufacturing the mold cavity insert 12. These processes for manufacturing the mold cavity insert 12 include, for example, selective laser sintering (SLS) technology and direct metal laser sintering (DMLS) technology. Additionally, these processes lend themselves to the use of a wide variety of materials including, but not limited to, steels, light alloys, super alloys and composites.

Figure 2:
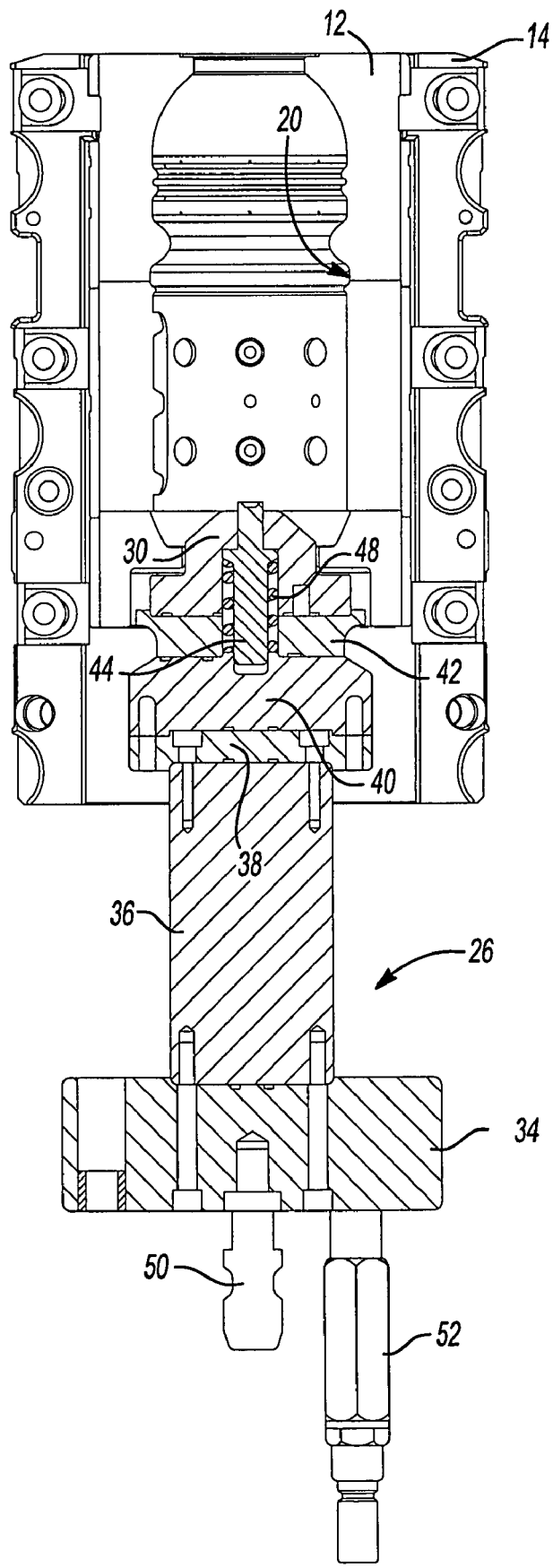
FIG. 2 is a cross-sectional view of a mold cavity insert assembly and a manifold insert assembly according to the present teachings and shown engaged to an exemplary pedestal assembly.

Turning now to FIG. 2, the mold cavity insert 12 and manifold insert 14 are shown cooperatively engaged to an exemplary pedestal assembly 26. The pedestal assembly 26 generally engages a base insert 30 of the mold cavity insert 12. The pedestal assembly 26 can include a spacer plate 34, an elongated spacer 36, a shim 38, an upper spacer 40, a base locating plate 42 and a plunger 44. The plunger 44 can be biased in a direction away from the upper spacer 40 by a biasing member 48. A locating lug 50 can be disposed on an end of the spacer plate 34. Fluid fittings 52 (only one is shown) can be coupled at the end of the spacer plate 34. In general, the pedestal assembly 26 translates axially to removably couple to the base insert 30 during formation of a container. It is appreciated that the pedestal assembly 26 is merely exemplary and may be formed differently and/or comprise other components.

Figure 3:
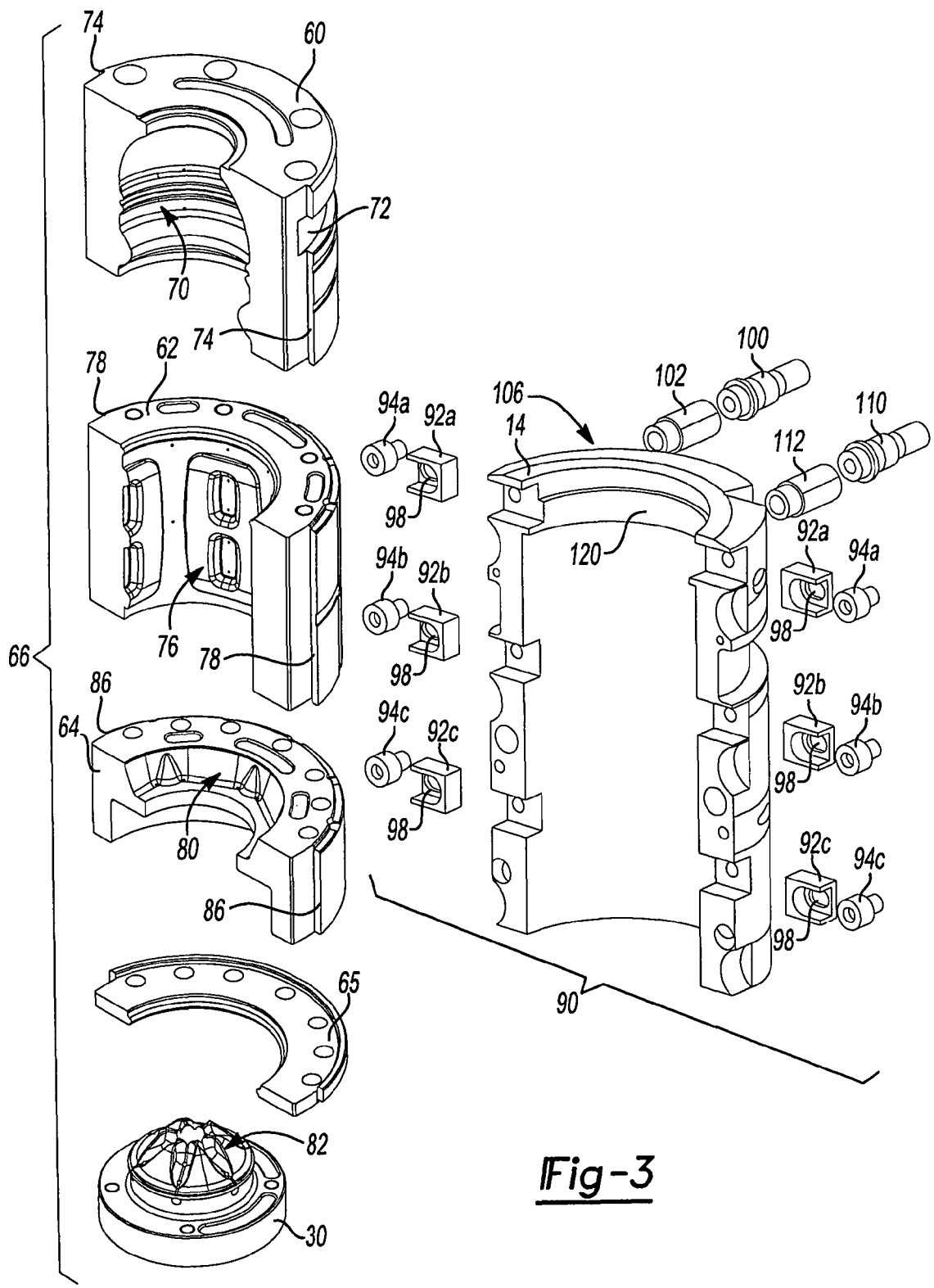
FIG. 3 is an exploded perspective view of the mold cavity insert assembly and manifold insert assembly of FIG. 2.

With reference now to FIG. 3, the mold cavity insert 12 will be described in greater detail. The mold cavity insert 12 generally includes a shoulder insert 60, a body insert 62, a heel insert 64, a wear ring 65 and the base insert 30 which are all collectively referred to herein as a cavity insert assembly 66. The shoulder insert 60 defines a shoulder profile 70 on its inner surface and an annular channel 72 on its outer surface. A first pair of ridges 74 are formed on the outer surface of the shoulder insert 60. The body insert 62 defines a body profile 76 on its inner surface and a second pair of ridges 78 on its outer surface. The heel insert 64 and the base insert 30 define a heel profile 80 and a base profile 82 on their inner surfaces, respectively. The heel insert 64 defines a third pair of ridges 86 on its outer surface. For illustrative and discussion purposes, only one-half of the shoulder insert 60, the body insert 62, the heel insert 64 and the wear ring 65 are shown in FIG. 3. It is appreciated however, that a complementary second half is provided to define the complete mold cavity.

With continued reference to FIG. 3, the manifold insert 14 is shown as part of a manifold insert assembly 90. The manifold insert assembly 90 can include various clamps 92a-92c and fasteners 94a-94c used to secure the manifold insert 14 relative to the cavity insert assembly 66 (see also, FIG. 2). More specifically, clamps 92a are adapted to locate at the first pair of ridges 74 on the shoulder insert 60. Clamps 92b are adapted to locate at the second pair of ridges 78 on the body insert 62. Clamps 92c are adapted to locate at the third pair of ridges 86 on the heel insert 64. Slots 98 formed in the respective clamps 92a-92c offer radial translation of clamps 92a-92c into engagement with the respective inserts of the cavity insert assembly 66. A fluid inlet fitting 100 is fluidly coupled to a fluid extension 102 connected at a first opening 104 (FIG. 5) formed in a first end 106 of the manifold insert 14. Similarly, a fluid outlet fitting 110 is fluidly coupled to a fluid extension 112 connected at a second opening 114 (FIG. 5) formed on the manifold insert 14. The manifold insert 14 defines an annular protrusion 120 (FIG. 4) adapted to locate within the annular channel 72 formed on the shoulder insert 60. Again, it is appreciated that a complementary second half is provided to define the complete manifold insert.

Figure 4:
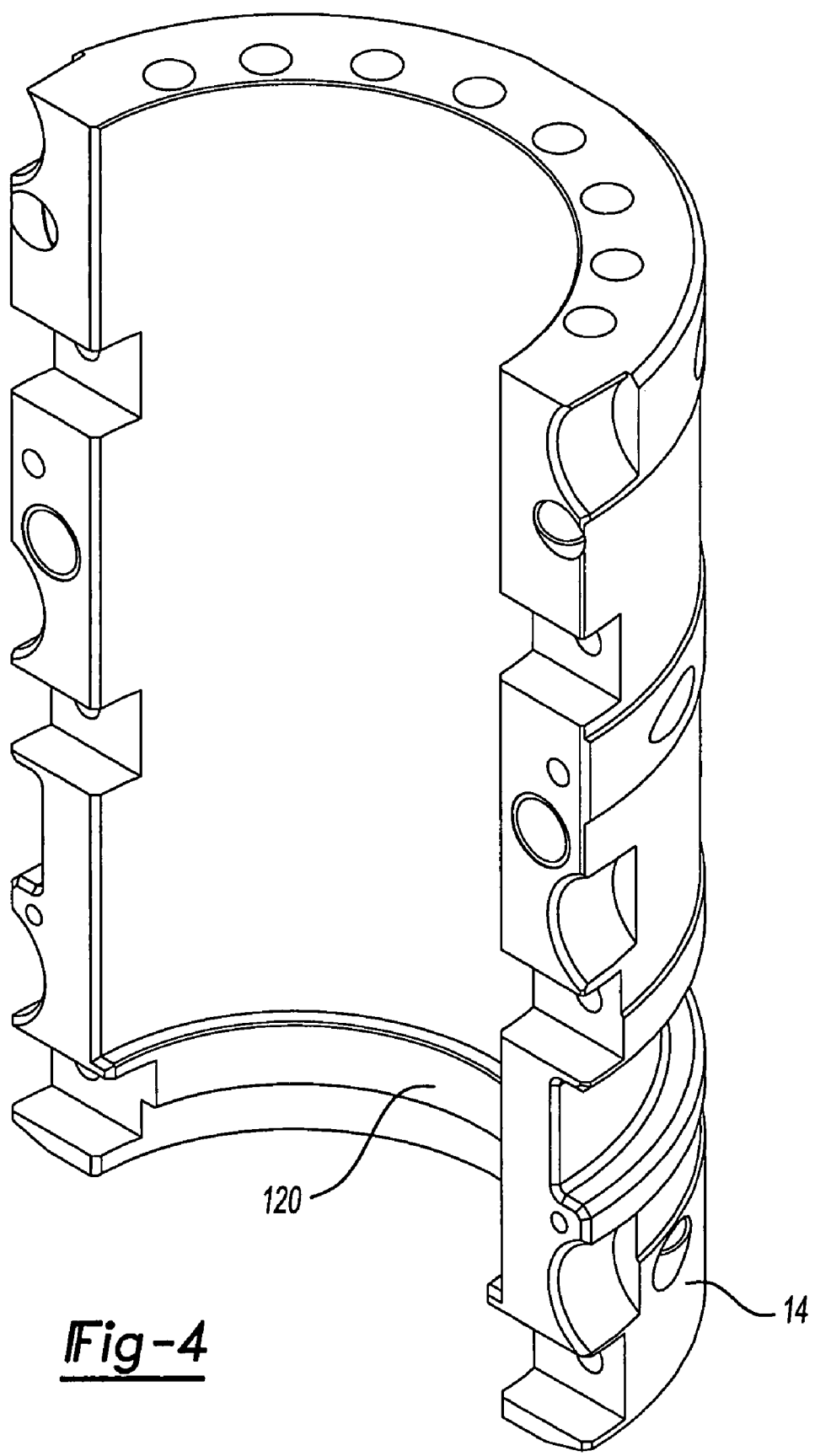
FIG. 4 is an inboard side perspective view of the manifold insert of FIG. 3.
Figure 5:
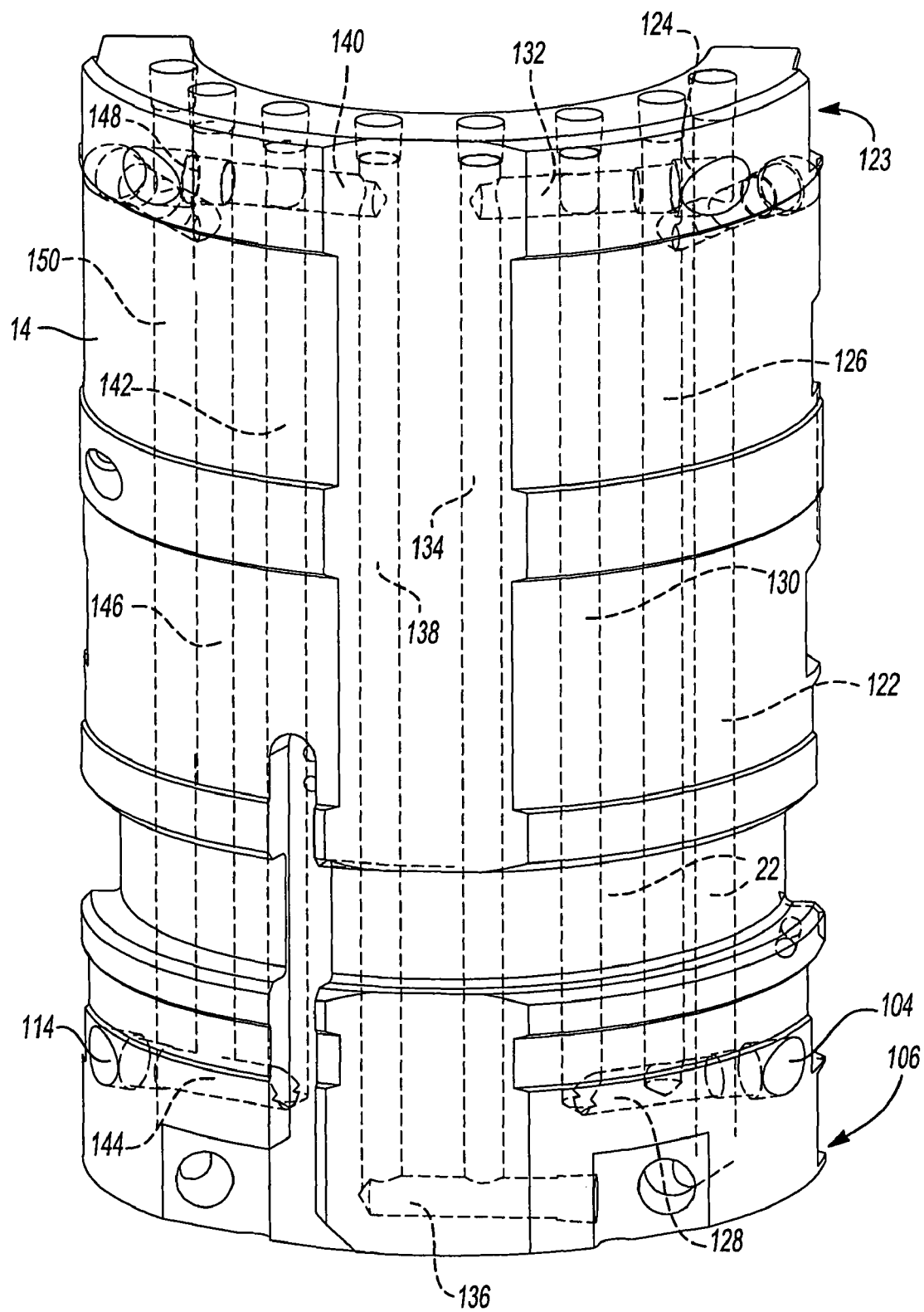
FIG. 5 is an outboard side perspective view of the manifold insert of FIG. 4 and shown with cooling channels in phantom line.

With reference now to FIGS. 4 and 5, the manifold insert 14 will be described in greater detail. The manifold insert 14 defines eight coolant channels 22 formed longitudinally therein. In this way, fluid is directed to flow from the fluid inlet fitting 100 (FIG. 3) into the first opening 104. From the first opening 104, the fluid is directed along a first longitudinal coolant channel 122 toward a second end 123 of the manifold insert 14. The fluid then flows through a first transverse connecting channel 124 and back to the first end 106 by way of a second longitudinal coolant channel 126. Fluid then is directed through a second transverse connecting channel 128 back toward the second end 123 through a third longitudinal coolant channel 130. The fluid then flows through a third transverse connecting channel 132 and back to the first end 106 by way of a fourth longitudinal coolant channel 134. Next, fluid is directed through a fourth transverse connecting channel 136 back toward the second end 123 through a fifth longitudinal coolant channel 138. The fluid then flows through a fifth transverse connecting channel 140 and back to the first end 106 through a sixth longitudinal coolant channel 142. Next, the fluid is directed through a sixth transverse connecting channel 144 back toward the second end 123 through a seventh longitudinal coolant channel 146. The fluid then flows through a seventh transverse connecting channel 148 and back to the first end 106 through an eighth longitudinal coolant channel 150. Fluid is finally directed out of the manifold insert 14 through the second opening 114. The collective eight coolant channels 22 (or individually 122, 126, 130, 134, 138, 142, 146 and 150) offer improved heat transfer control over fewer coolant channels formed in a cavity insert. By way of comparison, the eight coolant channels 22 provided by the manifold insert 14 provide an increase of about 25% cooling capability over a cavity insert having only six coolant channels. The cooling fluid may be any conventional cooling fluid.

The blow mold configuration according to the present teachings provides other advantages as well. For example, because the manifold insert 14 is separately formed from the mold cavity insert 12, it does not need to be removed during a cavity insert changeover. In this way, only the inner mold cavity insert 12 would need to be exchanged when formation of a container having a distinct size, profile, etc., is desired. Likewise, the manifold insert 14 can be used again for other container designs. Further, design and formation of subsequent cavity inserts is significantly less costly because there is no need to design and construct coolant channels. Mold cavity inserts formed without coolant channels can be lighter and easier to change out. In one example, the mold shell assembly 10 disclosed herein, while not limited to, may be particularly useful for formation of containers having less than 75 mm (2.95 inches) diameters (37.5 mm (1.48 inches) radius).

Additionally, the mold shell assembly 10 allows for optimal venting. According to a traditional prior art mold design, the exterior mounting features of the cavity, the interior mold definition of the cavity and the location of the fluid channels are all determined. Next, the cavity venting is located in the remaining space of the cavity. As can be appreciated, a compromise must be reached to accommodate all features within one mold cavity. The configuration of the present teachings provides the mold cavity insert 12 and the manifold insert 14 being separately formed from each other, resulting in a fluid channel/cavity vent compromise.

An exemplary method of forming a container with the blow mold shell assembly 10 will now be described. At the outset, the selected mold cavity insert 12 is located within the manifold insert 14. The manifold insert 14 may be removably secured inboard of the mold holder 16 and machine 18 (FIG. 1). The pedestal assembly 26 can also be selectively located in cooperative engagement with the base insert 30 of the cavity insert assembly 66. A machine (not illustrated) may place a preform (not illustrated) heated to a temperature between approximately 190° F. to 250° F. (approximately 88° C. to 121° C.) into the mold cavity insert 12. The mold cavity insert 12 may be heated to a temperature between approximately 250° F. to 350° F. (approximately 121° C. to 177° C.). A stretch rod apparatus (not illustrated) stretches or extends the heated preform within the mold cavity insert 12 to a length approximately that of the resultant container thereby molecularly orienting the polyester material in an axial direction generally corresponding with a central longitudinal axis of the container. While the stretch rod extends the preform, air having a pressure between 300 PSI to 600 PSI (2.07 MPa to 4.14 MPa) assists in extending the preform in the axial direction and in expanding the preform in a circumferential or hoop direction thereby substantially conforming the polyester material to the shape of the mold profile 20 of the mold cavity insert 12 and further molecularly orienting the polyester material in a direction generally perpendicular to the axial direction, thus establishing the biaxial molecular orientation of the polyester material in most of the container. The pressurized air holds the mostly biaxial molecularly oriented polyester material against the mold profile 20 of the mold cavity insert 12 for a period of approximately two (2) to five (5) seconds before removal of the container from the mold cavity. During the molding operation, fluid is passed through the coolant channels 22 in the manifold insert 14 to cool the mold cavity insert 12 and the blow mold shell assembly 10 as a whole. Other methods as well may be used to form a container utilizing the blow mold shell assembly 10.

Once the resultant container has been formed, the container is removed and the process repeats. When it is desired to mold a different container, such as one having a different shape, size and or profile, the mold cavity insert 12 is simply replaced with one having the desired characteristics. It is important to recognize at this point, that it is not necessary to replace or remove the manifold insert 14. Instead, the manifold insert 14 can be used again with the new mold cavity insert. In addition, the related fluid fittings 100 and 110 do not need to be replaced or reconnected. Rather, they simply remain fluidly connected to the manifold insert 14 and ready to supply fluid for the next mold sequence.

Alternatively, other manufacturing methods using other conventional materials including, for example, polypropylene, high-density polyethylene, polyethylene naphthalate (PEN), a PET/PEN blend or copolymer, and various multi-layer structures may be suitable for the manufacture of the resultant plastic container. Those having ordinary skill in the art will readily know and understand plastic container manufacturing method alternatives.

There are many bottled products where this technology may be applicable. Products such as dairy products, liquor, household cleaners, salad dressings, sauces, spreads, syrups, edible oils, personal care items, and others may be formed utilizing such a mold assembly. While much of the description has focused on the production of PET containers, it is contemplated that other polyolefin materials (e.g., polyethylene, polypropylene, etc.) as well as a number of other plastics may be processed using the teachings discussed herein.

While the above description constitutes the present disclosure, it will be appreciated that the disclosure is susceptible to modification, variation and change without departing from the proper scope and fair meaning of the accompanying claims.

What is claimed is:

1. A blow mold shell assembly comprising:
   a mold cavity insert defining a mold profile on an inner surface, said mold cavity insert is substantially solid throughout its cross-section and precluded from passing coolant, said mold cavity insert further comprising:
      a removable shoulder insert, a removable body insert, a removable heel insert, and a removable base insert that together form a container profile; and
   a manifold insert separately formed from said mold cavity insert, disposed in contact with and outboard of said mold cavity insert, said manifold insert further comprising:
      a plurality of coolant channels defined longitudinally in said manifold insert, said manifold insert defining a single fluid inlet opening to said plurality of coolant channels and a single fluid outlet opening from said plurality of coolant channels.

2. The blow mold shell assembly of claim 1 wherein eight coolant channels are formed longitudinally therethrough.

3. The blow mold shell assembly of claim 1, further comprising a mold holder arranged outboard of said manifold insert.

4. The blow mold shell assembly of claim 3 wherein said manifold insert is adapted to remain assembled to said mold holder during a mold cavity insert exchange.

5. The blow mold shell assembly of claim 1 wherein said mold profile defines a container radius of less than 37.5 mm (1.48 inches).

6. The blow mold shell assembly of claim 1 wherein said mold cavity insert is manufactured by one of a selective laser sintering process and a direct metal laser sintering process.

7. A blow mold shell assembly comprising:
   a first mold component having a mold profile on an inner surface, the first mold component further comprising:
      a separate removable shoulder insert, a separate removable body insert, a separate removable heel insert, and a separate removable base insert that together form the mold profile, said first mold component substantially solid throughout its cross-section and precluded from passing coolant;
   a second mold component disposed outboard of said first mold component; and
   a third mold component movable relative to and disposed intermediate of said first and second mold components, said third mold component including a manifold insert defining a plurality of coolant channels formed longitudinally therein, said manifold insert attached to said second mold component, said first mold component attachable and detachable to said manifold insert, said manifold insert further defining a single fluid inlet opening permitting access into said plurality of coolant channels and a single fluid outlet opening permitting access from said plurality of coolant channels.

8. The blow mold shell assembly of claim 7 wherein said plurality of coolant channels includes eight coolant channels.

9. The blow mold shell assembly of claim 7 wherein said manifold insert is adapted to remain assembled to said second mold component during a mold cavity insert exchange.

10. The blow mold shell assembly of claim 7 wherein said mold profile defines a container radius of less than 37.5 mm (1.48 inches).

11. A blow mold shell assembly comprising:
   a mold cavity insert defining a mold profile on an inner surface, said mold cavity insert defining a substantially solid cross-section free from coolant channels and further comprising a separate removable shoulder insert, a separate removable body insert, a separate removable heel insert, and a separate removable base insert that together form the mold profile;
   a manifold insert separately formed from said mold cavity insert disposed outboard of said mold cavity insert and having a plurality of coolant channels formed therein, wherein each of said shoulder insert, body insert, and heel insert are attached to said manifold insert with a separate clamp;

a single first fluid fitting and a single second fluid fitting connected to said manifold insert and adapted, respectively, to deliver fluid to and remove fluid from said manifold insert; and a holder insert separately formed from and disposed outboard of said manifold insert, said manifold insert attached to said holder insert.

12. The blow mold shell assembly of claim 11 wherein said manifold insert is adapted to remain assembled to said holder insert during a mold cavity insert exchange.

13. The blow mold shell assembly of claim 11 wherein said mold cavity insert is manufactured by one of a selective laser sintering process and a direct metal laser sintering process.

14. The blow mold shell assembly of claim 11 wherein said plurality of coolant channels are a plurality of longitudinal coolant channels, the blow mold shell assembly further comprising:

a plurality of transverse coolant channels that are situated transverse to said plurality of longitudinal coolant channels, wherein each longitudinal coolant channel is fluidly connected to an adjacent longitudinal coolant channel by only one of said plurality of transverse coolant channels.

* * * * *